United States Patent
Bai et al.

(10) Patent No.: US 8,547,659 B1
(45) Date of Patent: Oct. 1, 2013

(54) SYSTEM FOR PROVIDING A TRANSDUCER HAVING A MAIN COIL AND AN ADDITIONAL COIL SEPARATED FROM THE MAIN POLE BY A WRITE SHIELD

(75) Inventors: Zhigang Bai, Milpitas, CA (US); Zhanjie Li, Pleasanton, CA (US); Sharat Batra, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 81 days.

(21) Appl. No.: 13/103,872

(22) Filed: May 9, 2011

(51) Int. Cl.
*G11B 5/127* (2006.01)
*G11B 5/17* (2006.01)

(52) U.S. Cl.
USPC .................... 360/123.06; 360/123.11

(58) Field of Classification Search
USPC .............. 360/123.11, 123.15, 123.17, 123.06
See application file for complete search history.

(56) References Cited

U.S. PATENT DOCUMENTS

| | | | |
|---|---|---|---|
| 4,677,515 A * | 6/1987 | Schewe | 360/123.11 |
| 4,703,382 A * | 10/1987 | Schewe et al. | 360/123.11 |
| 4,713,711 A | 12/1987 | Jones, Jr. et al. | |
| 4,985,985 A | 1/1991 | Das | |
| 5,703,740 A | 12/1997 | Cohen et al. | |
| 5,875,080 A | 2/1999 | Seagle | |
| 5,995,342 A | 11/1999 | Cohen et al. | |
| 6,246,541 B1 | 6/2001 | Furuichi et al. | |
| 6,275,354 B1 | 8/2001 | Huai et al. | |
| 6,396,660 B1 | 5/2002 | Jensen et al. | |
| 6,483,662 B1 | 11/2002 | Thomas et al. | |
| 6,525,901 B1 | 2/2003 | Kamijima et al. | |
| 6,710,972 B1 | 3/2004 | Mochizuki et al. | |
| 6,940,688 B2 | 9/2005 | Jiang et al. | |
| 7,075,756 B1 | 7/2006 | Mallary et al. | |
| 7,126,788 B1 | 10/2006 | Liu et al. | |
| 7,206,168 B2 | 4/2007 | Sato et al. | |
| 7,248,433 B1 | 7/2007 | Stoev et al. | |
| 7,443,632 B1 | 10/2008 | Stoev et al. | |
| 7,511,921 B2 | 3/2009 | Mallary et al. | |
| 7,692,894 B2 | 4/2010 | Kobayashi | |
| 7,768,744 B2 | 8/2010 | Hsiao et al. | |
| 7,791,839 B2 | 9/2010 | Olson et al. | |
| 7,826,175 B2 | 11/2010 | Yokoyama et al. | |
| 8,116,032 B2 * | 2/2012 | Contreras et al. | 360/123.02 |
| 2002/0039254 A1 | 4/2002 | Taguchi et al. | |
| 2002/0191350 A1 | 12/2002 | Emilio Santini | |
| 2003/0030943 A1 | 2/2003 | Han et al. | |
| 2003/0202278 A1 | 10/2003 | Chen et al. | |
| 2004/0240106 A1 | 12/2004 | Iitsuka et al. | |
| 2005/0207061 A1 | 9/2005 | Mochizuki et al. | |
| 2006/0150397 A1 | 7/2006 | Basra et al. | |
| 2006/0176601 A1 | 8/2006 | Amin et al. | |
| 2008/0112080 A1 * | 5/2008 | Lengsfield et al. | 360/125.04 |
| 2009/0034121 A1 | 2/2009 | Ohta et al. | |

* cited by examiner

*Primary Examiner* — Brian Miller

(57) ABSTRACT

A method and system for providing a magnetic recording head is described. The magnetic recording head has an air-bearing surface (ABS) configured to reside in proximity to a media during use. The head includes a first coil, a second coil, a main pole, and a third coil. The first coil has a first plurality of turns and is configured to carry a first write current in a first direction. The second coil has a second plurality of turns and is configured to carry a second write current in a second direction. The main pole is between the first coil and the second coil. The third coil has a third plurality of turns configured to carry a third write current in a third direction.

22 Claims, 10 Drawing Sheets

SYSTEM FOR PROVIDING A TRANSDUCER HAVING A MAIN COIL AND AN ADDITIONAL COIL SEPARATED FROM THE MAIN POLE BY A WRITE SHIELD

BACKGROUND

FIG. 1 depicts a portion of a conventional magnetic recording transducer 10. For clarity, FIG. 1 is not to scale. The conventional transducer 10 includes a shield 12, main pole 14, yoke 16 (otherwise termed an auxiliary pole), coils 18 and 20, write shield/return pole 22 and back gap 24. The coils 18 and 20 may together form a helical coil. Alternatively, each coil 18 and 20 may be a pancake coil and have a second set of turns (not shown) further from the ABS. Although depicted as above the main pole 14 (with respect to the substrate that is not shown), the yoke 16 might be below the main pole 14. In operation, a current is driven through the coil(s) 18 and 20 to energize the main pole 14. As a result, the main pole 14 writes to the media (not shown).

Although the conventional transducer 10 may function, it may not be effective at higher data rates. The trend in magnetic recording is to higher areal densities and higher data rates. In the conventional transducer 10, the main pole 14 is driven by coils 18 and 20. However, the write shield 22 is driven only by the coil 20. Thus, the write shield may not be driven at sufficiently high data rates by the coil 20. In other words, the write shield 22 may lag the main pole 14. As a result, the transducer 10 may not be capable of writing at higher data rates. Thus, performance of the conventional transducer 10 may degrade.

Accordingly, what is needed is a system and method for improving performance of the transducer.

BRIEF SUMMARY OF THE INVENTION

A method and system for providing a magnetic recording head is described. The magnetic recording head has an air-bearing surface (ABS) configured to reside in proximity to a media during use. The head includes a first coil, a second coil, a main pole, and a third coil. The first coil has a first plurality of turns and is configured to carry a first write current in a first direction. The second coil has a second plurality of turns and is configured to carry a second write current in a second direction. The main pole is between the first coil and the second coil. The third coil has a third plurality of turns configured to carry a third write current in a third direction.

DETAILED DESCRIPTION OF THE EMBODIMENTS OF THE INVENTION

Figure 1:
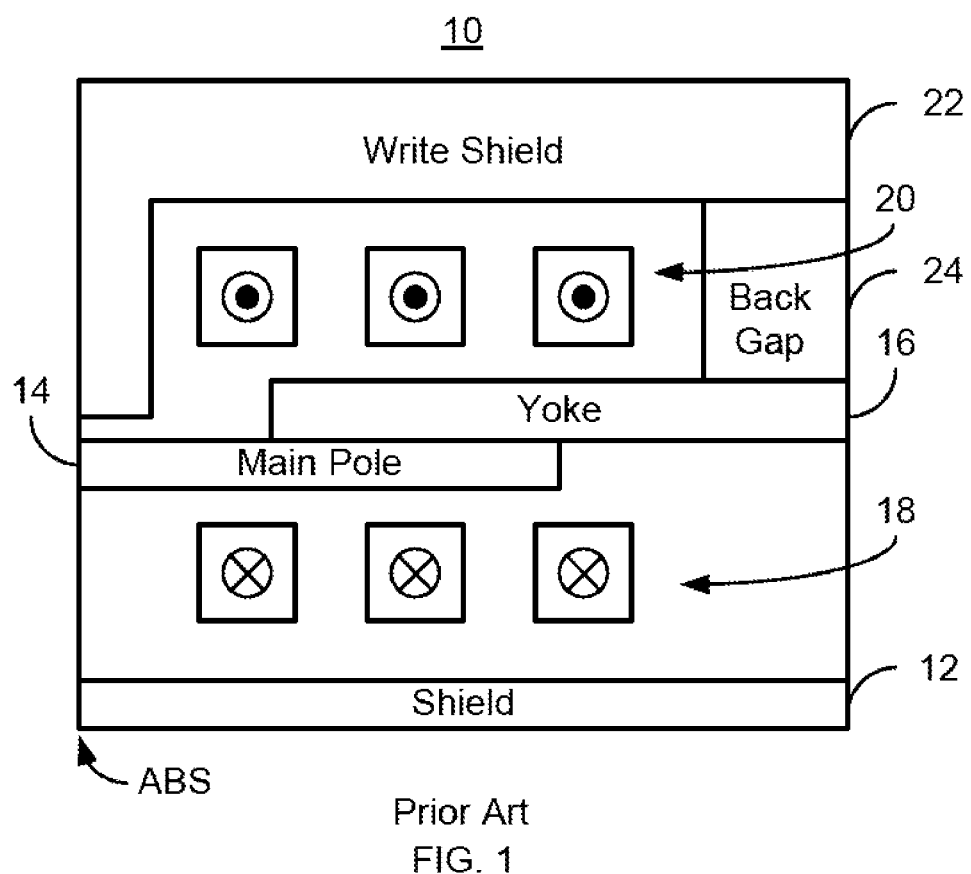
FIG. 1 is a diagram depicting a conventional transducer.
Figure 2:
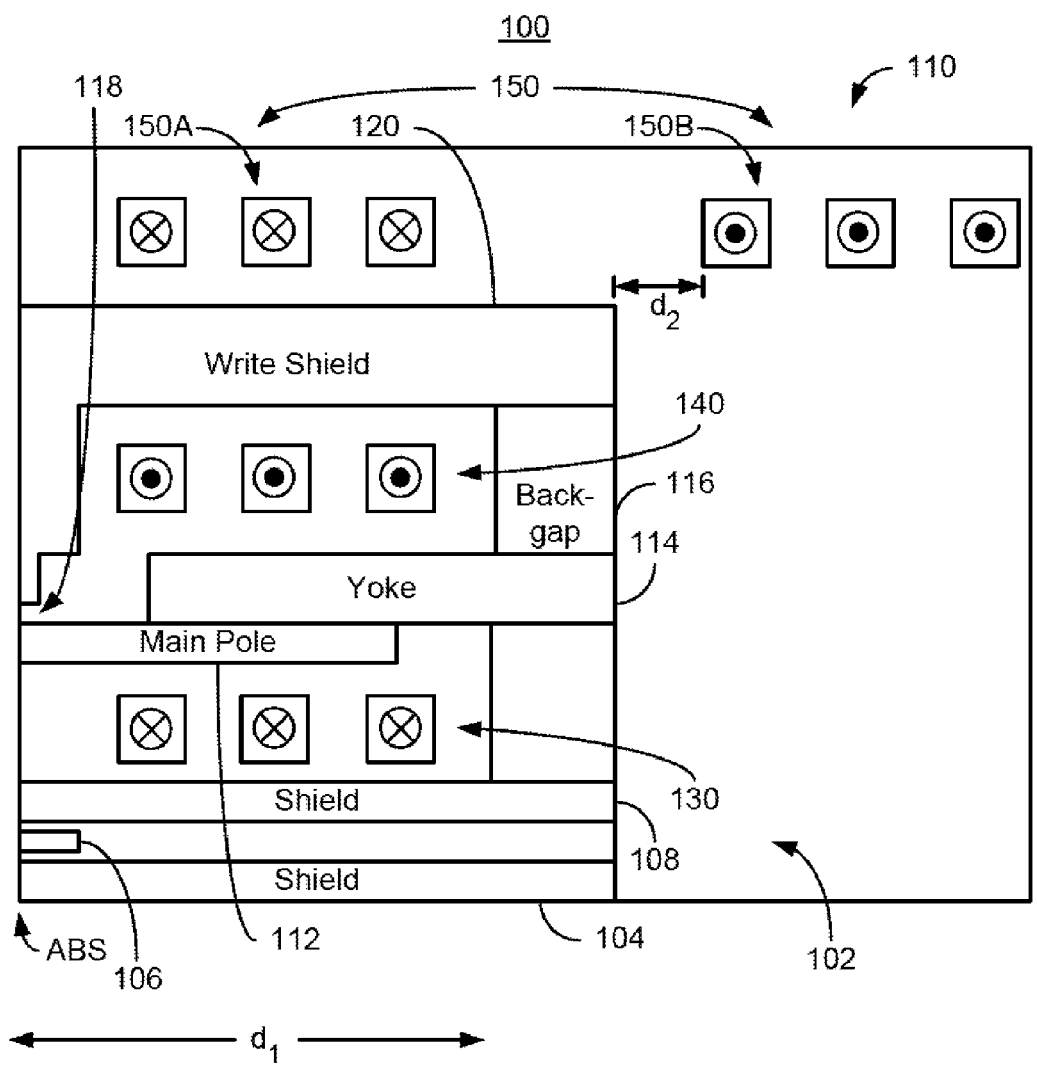
FIG. 2 is a diagram depicting an exemplary embodiment of a head.

FIG. 2 is a diagram depicting a side view of a portion of a magnetic recording head 100 that may reside on a slider (not shown) in a disk drive that also include media (not shown). For clarity, FIG. 2 is not to scale. For simplicity not all portions of the head 100 are shown. In addition, although the head 100 is depicted in the context of particular components other and/or different components may be used. Further, the arrangement of components may vary in different embodiments. The head 100 has an ABS configured to reside close to a media (not shown) during operation. The head 100 is a merged head including a read transducer 102 and a write transducer 110. The read transducer 102 includes shields 104 and 108 as well as read sensor 106. In other embodiments, the head 100 may include only the transducer 110.

The write transducer 110 may be considered to include the shield 108. In addition, the transducer 110 includes main pole 112, yoke 114 (otherwise known as an auxiliary pole), back-gap 116, write gap 118, write shield 120 that may also be considered to be a return pole, a first coil 130, a second coil 140, and a third coil 150. In some embodiments, the write transducer 110 may have other magnetic components, such as a wraparound shield or side shields that are not shown. The coils 130 and 140 are used to drive the main pole 112. Thus, the coils 130 and 140 carry current in the opposite direction. As a result, the fields from the coils 130 and 140 at the main pole 112 add. Although the current in coil 130 is shown into the plane of the page and the current in the coil 140 is shown out of the plane of the page, other directions are possible. For example, the coil 130 might carry current into the plane of the page while the coil 140 carries current out of the plane of the page. In the embodiment shown, the coils 130 and 140 are connected, forming a helical coil. In other embodiments, the coils 130 and 140 may be pancake coils. In such embodiments, other turns of the coils 130 and 140 would reside distal from the ABS. Finally, in an alternate embodiment, each of the coils 130 and 140 may be a helical coil with another portion of the coil 130 and 140, respectively residing distal from the main pole 112. Finally, both of the coils 130 and 140 are shown as having three turns. However, in other embodiments, the coils 130 and/or 140 may have a different number of turns.

The write transducer 110 also includes the third coil 150. The third coil has a plurality of turns 150A that is proximate to the write shield 120 and another plurality turns 150B away from the write shield 120. The third coil may be considered to be a third layer of turns for coil(s) that may be further from a substrate (not shown) than the first coil layer 130 and the second coil layer 140. In some embodiments, the distance from the write shield 120 to the turns 150B, $d_2$, may be at least two microns. In some such embodiments, $d_2$ may be 0.5 to three times the yoke length, $d_1$. The turns 150A close to the write shield 120 and ABS carry current. In some embodiments, the turns 150A carry current in the same direction as the coil 130. In such embodiments, therefore, the turns 150B carry current in the opposite direction. In the embodiment shown, the turns 150A and 150B form a pancake coil 150. Thus, the turns 150A are proximate to the ABS while the turns 150B are distal from the ABS in FIG. 2. In the embodiment shown, the turns 150A are substantially the same distance from the write shield 120 as the coil 140. However, in other embodiments, the turns 150A may be a different distance from the write shield 120 than the coil. In some embodiments, the coil 150 may be a helical coil. If wound in series with coils 130 and 140 and coil 140 has n turns, then the total number of turns in coils 130 and 150 is n−1, n, or n+1. However, in other embodiments, the helical coil 150 may be wound separately from the coils 130 and 140.

In operation, the coils 130 and 140 are energized and drive the main pole 112, which writes to the media (not shown). The direction of current in each of the coils 130 and 140 generally depends upon the data to be written. However, the write current in one coil 130 is opposite to the write current in the other coil 140. Thus, the magnetic fields from the coils 130 and 140 are in substantially the same direction and add in the region of the main pole 112. Stated differently, both coils 120 and 130 drive the main pole 112. In addition, the coil 150 carries a current during writing. The current in the turns 150A of the coil 150 is opposite to the current in the coil 140. In addition, the current in the turns 150A of the coil 150 may be less than the current driven in the coil 130 and/or the coil 140. In other embodiments, the current through the coil 150 may be the same as the current through the coils 130 and/or 140. As a result, the coils 130, 140, and 150 may be driven together or separately. Thus, the magnetic fields from the coils 140 and 150 are in substantially the same direction and add in the region of the write shield 120. Thus, the coils 140 and 150 drive the write shield 120.

The magnetic recording head 100 may have improved performance at high data rates. Both the main pole 112 and the write shield 120 are driven by two coils. More specifically, the write shield 120 may be driven by two coils 140 and 150, allowing the response of the write shield 120 to be improved. Stated differently the write shield 120 may be more active than reactive. Thus, the write shield 120 may be less likely to lag the main pole 112. Further, use of the additional coil 150 may allow for a shorter yoke length for the main pole 112. For example, the yoke length is the distance from the ABS to the front edge of the backgap 116. The conventional head 10 may have a yoke length on the order of six to seven micrometers or more. In contrast, the magnetic recording head may have a yoke length ($d_1$) of less than six micrometers. Use of the additional coil 150 may also allow the number of turns in the coil(s) 130 and/or 140 to be reduced. For example, the coil 130 and/or 140 may have two turns. In such an embodiment, the yoke length may be not more than substantially 3.5 micrometers. A shorter yoke length may allow for reduced resistance and inductance of the coil(s) 130 and/or 140. Thus, performance of the magnetic recording head 100 may be further improved.

Figure 3:
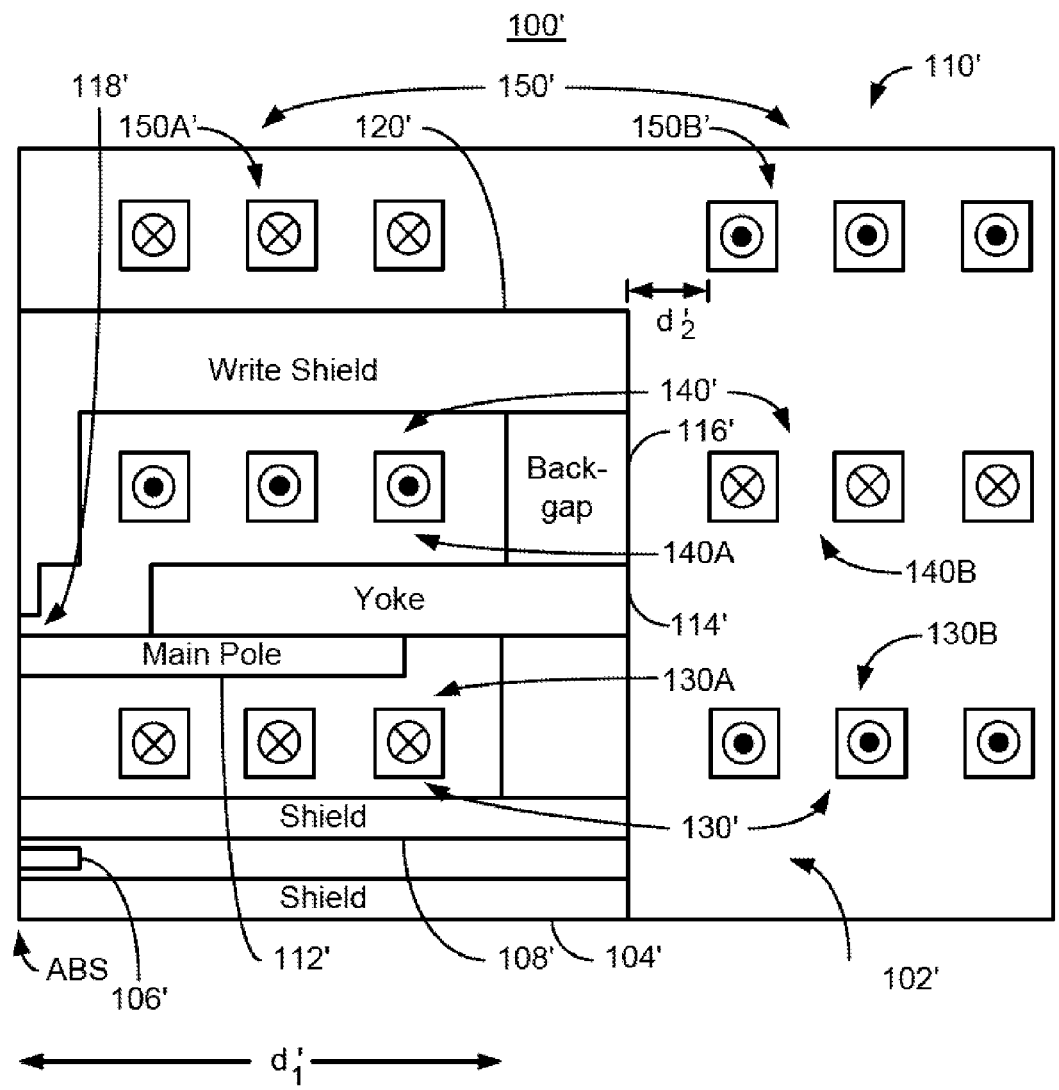
FIG. 3 is a diagram depicting another exemplary embodiment of a head.

FIG. 3 depicts a side view of another exemplary embodiment of a magnetic recording head 100'. For clarity, FIG. 3 is not to scale. For simplicity not all portions of the magnetic recording head 100' are shown. In addition, although the magnetic recording head 100' is depicted in the context of particular components other and/or different components may be used. Further, the arrangement of components may vary in different embodiments. The magnetic recording head 100' has an ABS configured to reside close to a media (not shown) during operation. The write transducer 110' may be in a merged head including a read transducer and the write transducer 110' or may be in a separate write head. The magnetic recording head 100' is analogous to the magnetic recording head 100. Consequently, analogous portions have similar labels. The magnetic recording head 100' thus includes a read transducer 102' and a write transducer 110' that are analogous to the read transducer 102 and the write transducer 110, respectively. The read transducer 102' thus includes shields 108' and 104' and sensor 106' analogous to the components 108, 104, and 106, respectively. The write transducer 110' thus includes the shield 108', coil(s) 130' and 140', main pole 112', yoke 114', backgap 116', write gap 118', write shield 120', and additional coil 150' including turns 150A' and 150B' that are analogous to coil(s) 130 and 140, main pole 112, yoke 114, backgap 116, write gap 118, write shield 120, and additional coil 150 including turns 150A and 150B, respectively. In some embodiments, the transducer 110' may have other magnetic components, such as a wraparound shield or side shields that are not shown.

In the write transducer 110', the coils 130' and 140' are pancake coils. Thus, the coil 130' includes turns 130A proximate to the main pole 112' and ABS as well as turns 130B distal from the main pole and ABS. Similarly, the coil 140' includes turns 140A proximate to the main pole 112' and ABS as well as turns 140B distal from the main pole and ABS. The third coil 150' shown is also a pancake coil. However, in other embodiments, the coil 150' may be a helical coil.

The magnetic recording head 100' operates in an analogous manner to and may share the benefits of the magnetic recording head 100. In particular, the write transducer 110' may have improved performance at high data rates. Both the main pole 112' and the write shield 120' are driven by two coils. Thus, the response of the write shield 120' may be improved. Further, use of the additional coil 150' in another layer than the coils 130' and 140' may allow for a shorter yoke length for the main pole 112'. For example, the magnetic recording head 100' may have a yoke length (included as part of $d_1$') of less than six micrometers. Use of the additional coil 150' may also allow the number of turns in the coil(s) 130' and/or 140' to be reduced. In some such embodiments, the yoke length may be less than six micrometers. In some such embodiments, the yoke length is not more than substantially 3.5 micrometers. A shorter yoke length may allow for reduced resistance and inductance of the coil(s) 130' and/or 140'. Thus, performance of the magnetic recording head 100' may be further improved.

Figure 4:
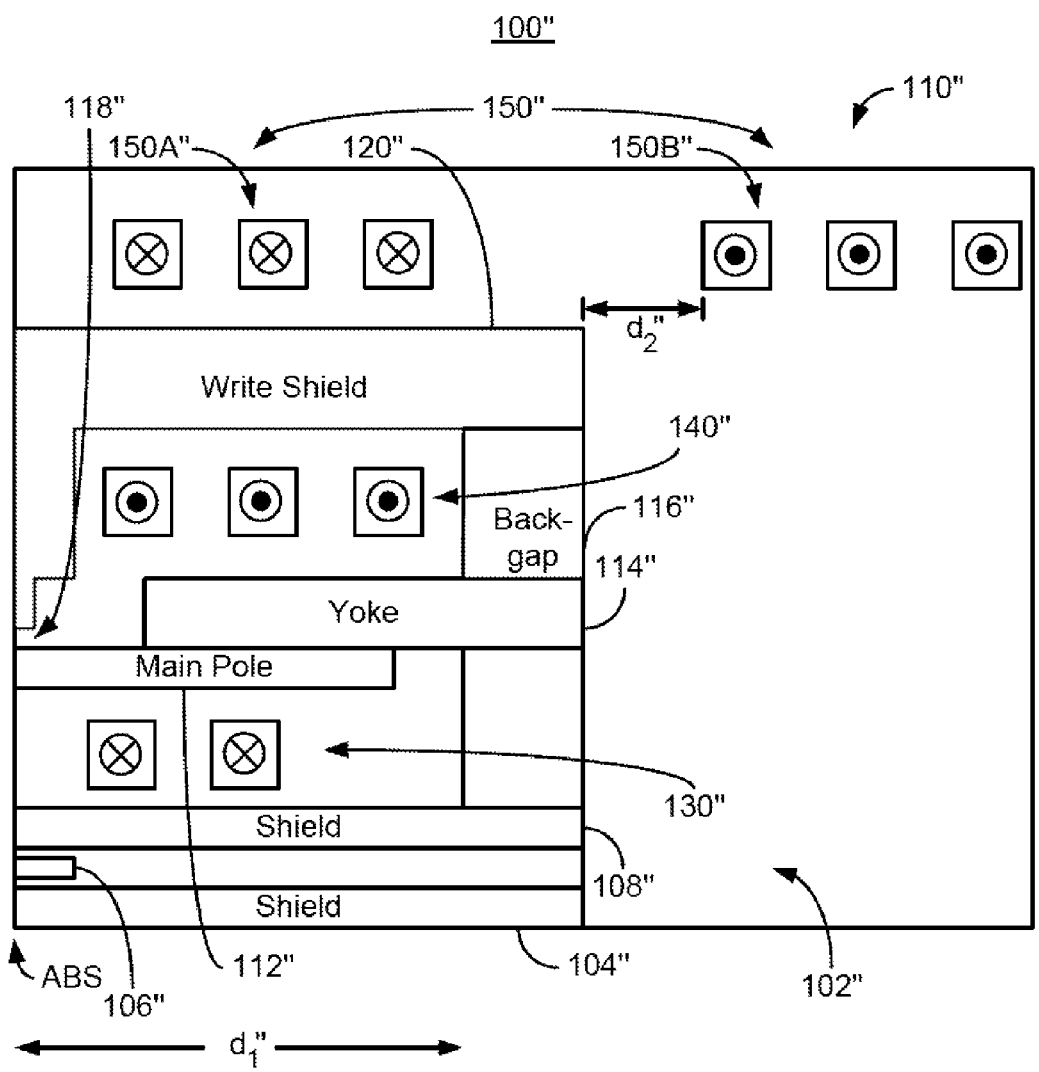
FIG. 4 is a diagram depicting another exemplary embodiment of a head.

FIG. 4 depicts a side view of another exemplary embodiment of a magnetic recording head 100". For clarity, FIG. 4 is not to scale. For simplicity not all portions of the magnetic recording head 100' are shown. In addition, although the magnetic recording head 100" is depicted in the context of particular components other and/or different components may be used. Further, the arrangement of components may vary in different embodiments. The magnetic recording head 100" has an ABS configured to reside close to a media (not shown) during operation. The write transducer 110" may be in a merged head including a read transducer and the write transducer 110" or may be in a separate write head. The magnetic recording head 100" is analogous to the magnetic recording heads 100 and 100'. Consequently, analogous portions have similar labels. The magnetic recording head 100" thus includes a read transducer 102" and a write transducer 110" that are analogous to the read transducer 102/102' and the write transducer 110/110', respectively. The read transducer 102" thus includes shields 108" and 104" and sensor 106" analogous to the components 108/108', 104/104', and 106/106', respectively. The write transducer 110" thus includes the shield 108", coil(s) 130" and 140", main pole 112", yoke 114", backgap 116", write gap 118", write shield 120", and additional coil 150" including turns 150A" and 150B" that are analogous to coil(s) 130/130' and 140/140', main pole 112/112', yoke 114/114', backgap 116/116', write gap 118/118', write shield 120/120', and additional coil 150/150' including turns 150A/150A' and 150B/150B', respectively. In some embodiments, the transducer 110" may have other magnetic components, such as a wraparound shield or side shields that are not shown.

In the write transducer 110", the coils 130" and 140" form a helical coil. In other embodiments, the coils 130" and/or 140" may be pancake coils. Further, the number of turns of the coil 130" has been reduced. In another embodiment, the number of turns for the coil 140" may also be reduced. The third coil 150" is a pancake coil. However, in other embodiments, the coil 150" may be a helical coil.

The magnetic recording head 100" operates in an analogous manner to and may share the benefits of the magnetic recording heads 100 and 100'. In particular, the write transducer 110" may have improved performance at high data rates. Both the main pole 112" and the write shield 120" are driven by two coils. Thus, the response of the write shield 120" may be improved. Further, use of the additional coil 150" in another layer than the coils 130" and 140" may allow for a shorter yoke length for the main pole 112" as well as for the reduced number of turns in the coil 130". For example, the magnetic recording head 100" may have a yoke length (included as part of $d_1$") of less than six micrometers. Use of the additional coil 150" may also allow the number of turns in the coil(s) 130" and/or 140" to be reduced. In the embodiment shown, the number of turns of the coil 130" has been reduced. The yoke may thus be further reduced in length. For example, the yoke length may be less than four micrometers. In some such embodiments, the yoke length is not more than substantially 3.5 micrometers. A shorter yoke length may allow for reduced resistance and inductance of the coil(s) 130" and/or 140". Thus, performance of the magnetic recording head 100" may be further improved.

Figure 5:
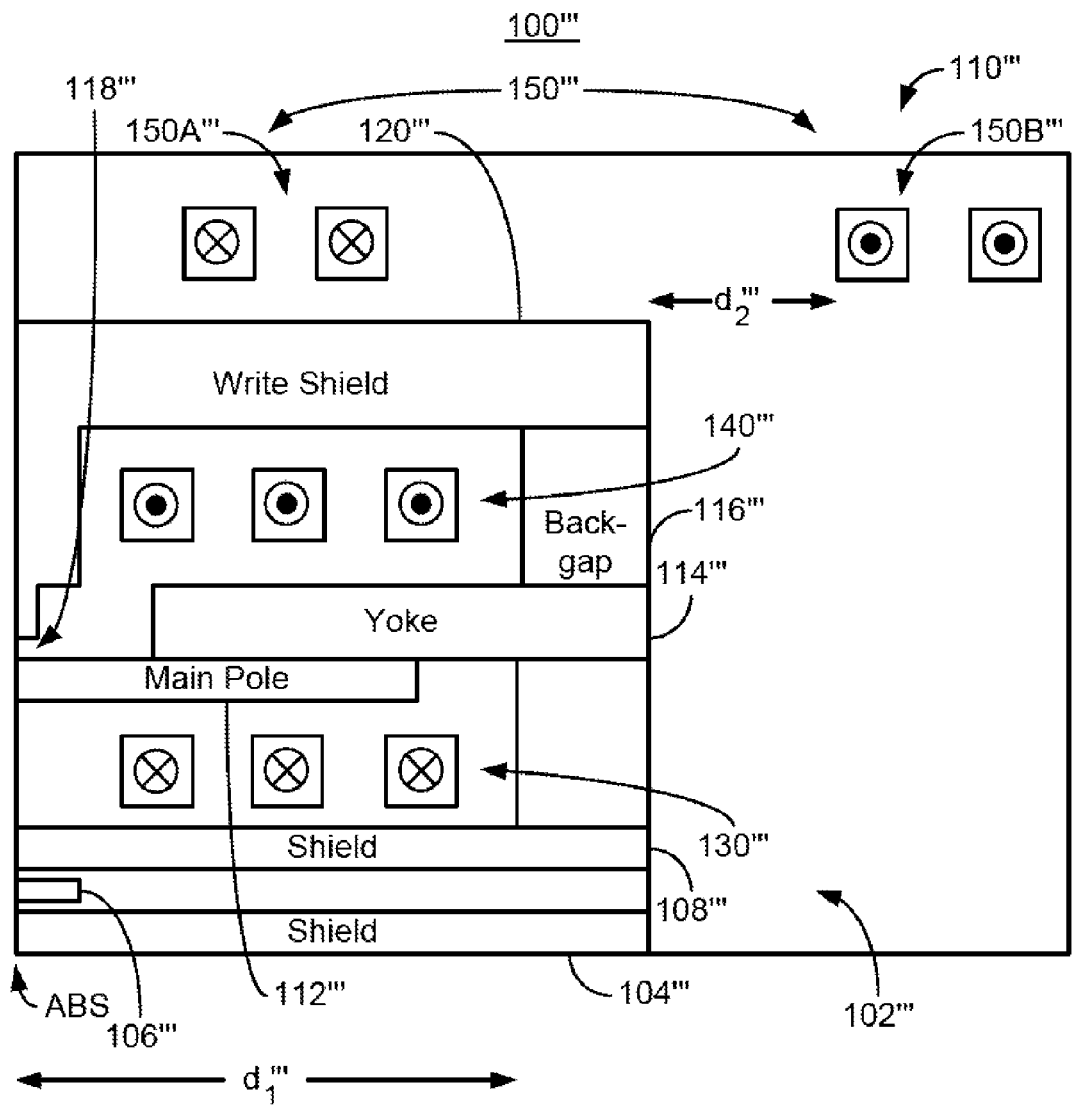
FIG. 5 is a diagram depicting another exemplary embodiment of a head.

FIG. 5 depicts a side view of another exemplary embodiment of a magnetic recording head 100'". For clarity, FIG. 5 is not to scale. For simplicity not all portions of the magnetic recording head 100'" are shown. In addition, although the magnetic recording head 100'" is depicted in the context of particular components other and/or different components may be used. Further, the arrangement of components may vary in different embodiments. The magnetic recording head 100'" has an ABS configured to reside close to a media (not shown) during operation. The write transducer 110'" may be in a merged head including a read transducer and the write transducer 110'" or may be in a separate write head. The magnetic recording head 100'" is analogous to the magnetic recording heads 100, 100', and 100". Consequently, analogous portions have similar labels. The magnetic recording head 100'" thus includes a read transducer 102'" and a write transducer 110'" that are analogous to the read transducer 102/102'/102" and the write transducer 110/110'/110", respectively. The read transducer 102'" includes shields 108'" and 104'" and sensor 106'" analogous to the components 108/108'/108", 104/104'/104", and 106/106'/106", respectively. The write transducer 110'" includes the shield 108'", coil(s) 130'" and 140'", main pole 112'", yoke 114'", backgap 116'", write gap 118'", write shield 120'", and additional coil 150'" including turns 150A'" and 150B'" that are analogous to coil(s) 130/130'/130" and 140/140'/140", main pole 112/112'/112", yoke 114/114'/114", backgap 116/116'/116", write gap 118/118'/118", write shield 120/120'/120", and additional coil 150/150'/150" including turns 150A/150A'/150A" and 150B/150B'/150B", respectively. In some embodiments, the transducer 110'" may have other magnetic components, such as a wraparound shield or side shields that are not shown.

In the write transducer 110'", the coils 130'" and 140'" form a helical coil. In other embodiments, the coils 130'" and/or 140'" may be pancake coils. The third coil 150'" is a pancake coil. In other embodiments, the coil 150'" may be a helical coil in which turns 150B' are distal from the write shield 120'", but closer to the ABS. In addition, the third coil 150'" has a different number of turns than the coils 130'" and 140'". In the embodiment shown, the third coil 150'" has fewer turns than the coils 130'" and 140'". However, in other embodiments the third coil 150'" may have a different number of turns, including more turns than the coils 130'" and 140'". Further, the coils 130'" and/or 140'" may have a different number of turns.

The magnetic recording head 100'" operates in an analogous manner to and may share the benefits of the magnetic recording heads 100, 100', and 100". In particular, the write transducer 110'" may have improved performance at high data rates. Both the main pole 112'" and the write shield 120'" are driven by two coils. Thus, the response of the write shield 120'" may be improved. Further, use of the additional coil 150'" in another layer than the coils 130'" and 140'" may allow for a shorter yoke length for the main pole 112'" as well as for the reduced number of turns in the coil 130'". For example, the magnetic recording head 100'" may have a yoke length (included as part of $d_1$'") of less than six micrometers. Use of the additional coil 150'" may also allow the number of turns in the coil(s) 130'" and/or 140'" to be reduced. In some such embodiments, the yoke length may be less than four micrometers. In some such embodiments, the yoke length is not more than substantially 3.5 micrometers. A shorter yoke length may allow for reduced resistance and inductance of the coil(s) 130'" and/or 140'". Thus, performance of the magnetic recording head 100'" may be further improved.

Figure 6:
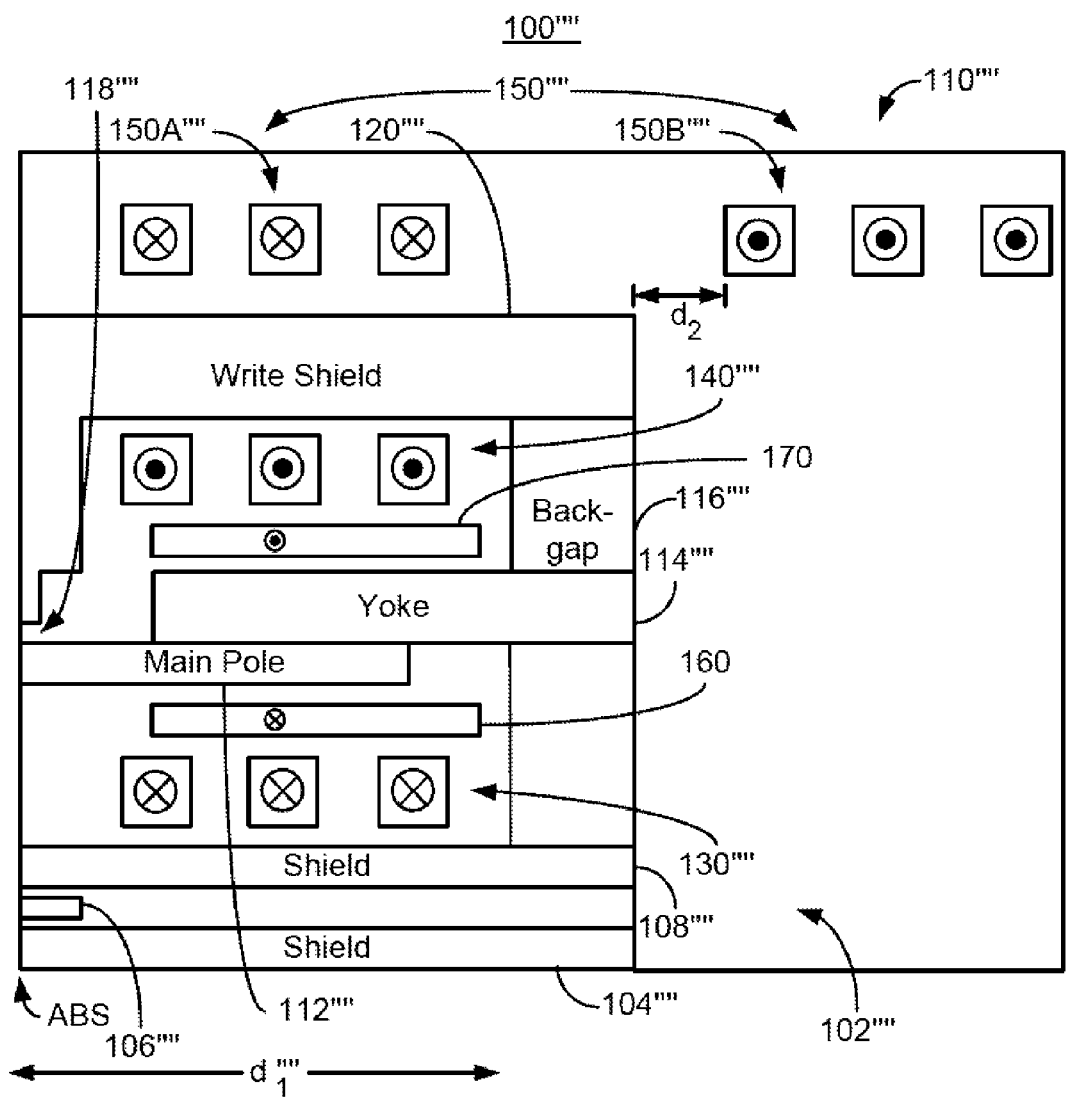
FIG. 6 is a diagram depicting another exemplary embodiment of a head.

FIG. 6 depicts a side view of another exemplary embodiment of a magnetic recording head 100"". For clarity, FIG. 6 is not to scale. For simplicity not all portions of the magnetic recording head 100"" are shown. In addition, although the magnetic recording head 100"" is depicted in the context of particular components other and/or different components may be used. Further, the arrangement of components may vary in different embodiments. The magnetic recording head 100"" has an ABS configured to reside close to a media (not shown) during operation. The write transducer 110"" may be in a merged head including a read transducer and the write transducer 110"" or may be in a separate write head. The magnetic recording head 100"" is analogous to the magnetic recording heads 100, 100', 100" and 100'". Consequently, analogous portions have similar labels. The magnetic recording head 100"" thus includes a read transducer 102"" and a write transducer 110"" that are analogous to the read transducer 102/102'/102"/1102'" and the write transducer 110/110'/110"/110'", respectively. The read transducer 102"" includes shields 108"" and 104"" and sensor 106"" analogous to the components 108/108'/108"/108'", 104/104'/104"/104'", and 106/106'/106"/106'", respectively. The write transducer 110"" includes the shield 108"", coil(s) 130"" and 140"", main pole 112"", yoke 114"", backgap 116"", write gap 118"", write shield 120"", and additional coil 150"" including turns 150A"" and 150B"" that are analogous to coil(s) 130/130'/130"/130'" and 140/140'/140"/140'", main pole 112/112'/112"/112'", yoke 114/114'/114"/114'", backgap 116/116'/116"/116'", write gap 118/118'/118"/118'", write shield 120/120'/120"/120'", and additional coil 150/150'/150"/150'" including turns 150A/150A'/150A"/150A'" and 150B/150B'/150B"/150'", respectively. In some embodiments, the transducer 110"" may have other magnetic components, such as a wraparound shield or side shields that are not shown.

In the write transducer 110"", the coils 130"" and 140"" form a helical coil. In other embodiments, the coils 130"" and/or 140"" may be pancake coils. The third coil 150"" is a pancake coil. In other embodiments, the coil 150'" may be a helical coil.

In addition, the write transducer 110"" includes optional additional coils 160 and 170. In some embodiments, only the coil 160 is provided. In other embodiments, only the coil 170 is present. In other embodiments, both coils 160 and 170 are present. The coils 160 and 170 are pancake coils for which one turn is shown. The remainder of the coils 160 and 170, which would reside distal from the ABS in a manner similar to the coil 150"", are not shown. In other embodiments, the coils 160 and 170 might form an additional helical coil. The coil 160 resides on the same side of the main pole 112"" as the coil 130"". The coil 160 thus carries current in the same direction as the coil 130"". Similarly, the coil 170 resides on the same side of the main pole 112"" as the coil 140"". The coil 170 thus carries current in the same direction as the coil 140"". Although the coil 160 is shown as between the coil 130"" and the main pole 112''', the coil 130"" might reside between the main pole 112"" and the coil 160. Similarly, although the coil 170 is shown as between the coil 140"" and the main pole 112''', the coil 140"" might reside between the main pole 112"" and the coil 170. Thus, additional coil(s) 160 and/or 170 used in driving the main pole 112"" may be provided.

The magnetic recording head 100''' operates in an analogous manner to and may share the benefits of the magnetic recording heads 100, 100', 100", and 100'''. In particular, the write transducer 110"" may have improved performance at high data rates. Both the main pole 112"" and the write shield 120"" are driven by at least two coils. Thus, the response of the write shield 120"" may be improved. Further, use of the additional coil 150"" in another layer than the coils 130"" and 140"" may allow for a shorter yoke length for the main pole 112"" as well as for the reduced number of turns in the coil 130"". For example, the magnetic recording head 100"" may have a yoke length (included as part of $d_1$"") of less than six micrometers. Use of the additional coil 150"" may also allow the number of turns in the coil(s) 130"" and/or 140"" to be reduced. In some such embodiments, the yoke length may be less than six micrometers. In some such embodiments, the yoke length is not more than substantially 3.5 micrometers. A shorter yoke length may allow for reduced resistance and inductance of the coil(s) 130"" and/or 140"". Thus, performance of the magnetic recording head 100"" may be further improved.

Figure 7:
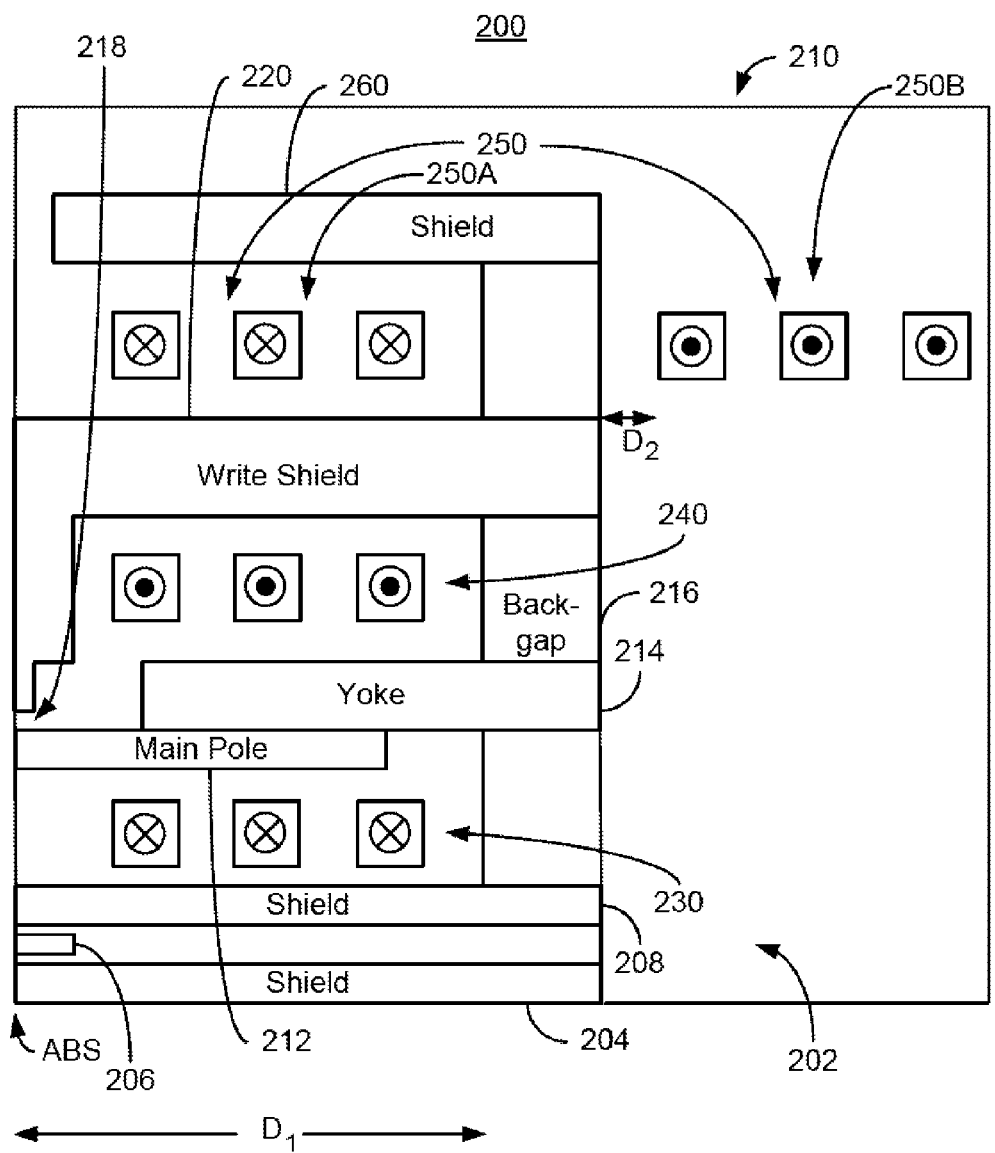
FIG. 7 is a diagram depicting another exemplary embodiment of a head.

FIG. 7 depicts a side view of another exemplary embodiment of a magnetic recording head 200. For clarity, FIG. 7 is not to scale. For simplicity not all portions of the magnetic recording head 200 are shown. In addition, although the magnetic recording head 200 is depicted in the context of particular components other and/or different components may be used. Further, the arrangement of components may vary in different embodiments. The magnetic recording head 200 has an ABS configured to reside close to a media (not shown) during operation. The write transducer 210 may be in a merged head including a read transducer 202 and the write transducer 210 or may be in a separate write head. The magnetic recording head 200 is analogous to the magnetic recording heads 100, 100', 100", 100''', and 100"". Consequently, analogous portions have similar labels. The magnetic recording head 200 thus includes a read transducer 202 and a write transducer 210 that are analogous to the read transducer 102/102'/102"/102'''/102"" and the write transducer 110/110'/110"/110'''/110"", respectively. The read transducer 202 includes shields 208 and 204 and sensor 206 analogous to the components 108/108'/108"/108'''/108"", 104/104'/104"/104'''/104"", and 106/106'/106"/106'''/106"", respectively. The write transducer 210 includes the shield 208, coil(s) 230 and 240, main pole 212, yoke 214, backgap 216, write gap 218, write shield 220, and additional coil 250 including turns 250A and 250B that are analogous to coil(s) 130/130'/130"/130'''/130"" and 140/140'/140"/140'''/140"", main pole 112/112'/112"/112'''/112"", yoke 114/114'/114"/114'''/114"", backgap 116/116'/116"/116'''/116"", write gap 118/118'/118"/118'''/118"", write shield 120/120'/120"/120'''/120"", and additional coil 150/150'/150"/150'''/150"" including turns 150A/150A'/150"/150'''/150"" and 150B/150B'/150B"/150B'''/150B"", respectively. The transducer 210 also has a yoke length $D_1$ that is analogous to the yoke lengths $d_1$, $d_1'$, $d_1"$, $d_1'''$, and $d_1""$. Similarly, the transducer 210 has a coils 250B a distance $D_2$ from the backgap 216 that is analogous to the distance $d_2$, $d_2'$, $d_2"$, $d_2'''$, and $d_2""$. In some embodiments, the transducer 210 may have other magnetic components, such as a wraparound shield or side shields that are not shown.

In the write transducer 210, the coils 230 and 240 may form a helical coil. In other embodiments, the coils 230 and/or 240 may be pancake coils. The third coil 250 is a pancake coil. In other embodiments, the coil 250 may be a helical coil in which turns 250B are distal from the write shield 220, but closer to the ABS. In addition, the third coil 250 has a different number of turns than the coils 230 and 240. In the embodiment shown, the third coil 250 has the same number of turns as the coils 230 and 240. However, in other embodiments the third coil 250 may have a different number of turns, including more or less turns than the coils 230 and/or 240. Further, the coils 230 and/or 240 may have a different number of turns.

The write transducer 210 also includes an additional shield 260. In the embodiment shown, the shield 260 is recessed from the ABS. However, in other embodiments, the shield 260 may extend to the ABS. The turns 250A reside between the shield 260 and the write shield 220. Thus, the coil 250 still aids in driving the write shield 220. In addition, the presence of the additional shield 260 further aids in magnetically shielding regions of the media (not shown) from being inadvertently written by the transducer 210.

The magnetic recording head 200 operates in an analogous manner to and may share the benefits of the magnetic recording heads 100, 100', 100", 100''', and 100"". In particular, the write transducer 210 may have improved performance at high data rates. Both the main pole 212 and the write shield 220 are driven by two coils. Thus, the response of the write shield 220 may be improved. Further, use of the additional coil 250 in another layer than the coils 230 and 240 may allow for a shorter yoke length for the main pole 212 as well as for the reduced number of turns in the coil 230. For example, the magnetic recording head 200 may have a yoke length $D_1$ of less than six micrometers. Use of the additional coil 250 may also allow the number of turns in the coil(s) 230 and/or 240 to be reduced. For example, the number of turns of the coil 230 and/or 240 may be two. In some such embodiments, the yoke length is not more than substantially 3.5 micrometers. A shorter yoke length may allow for reduced resistance and inductance of the coil(s) 230 and/or 240. In addition, the presence of the shield 260 may reduce inadvertent writing of other portions of the media (not shown). Thus, performance of the magnetic recording head 200 may be further improved.

Figure 8:
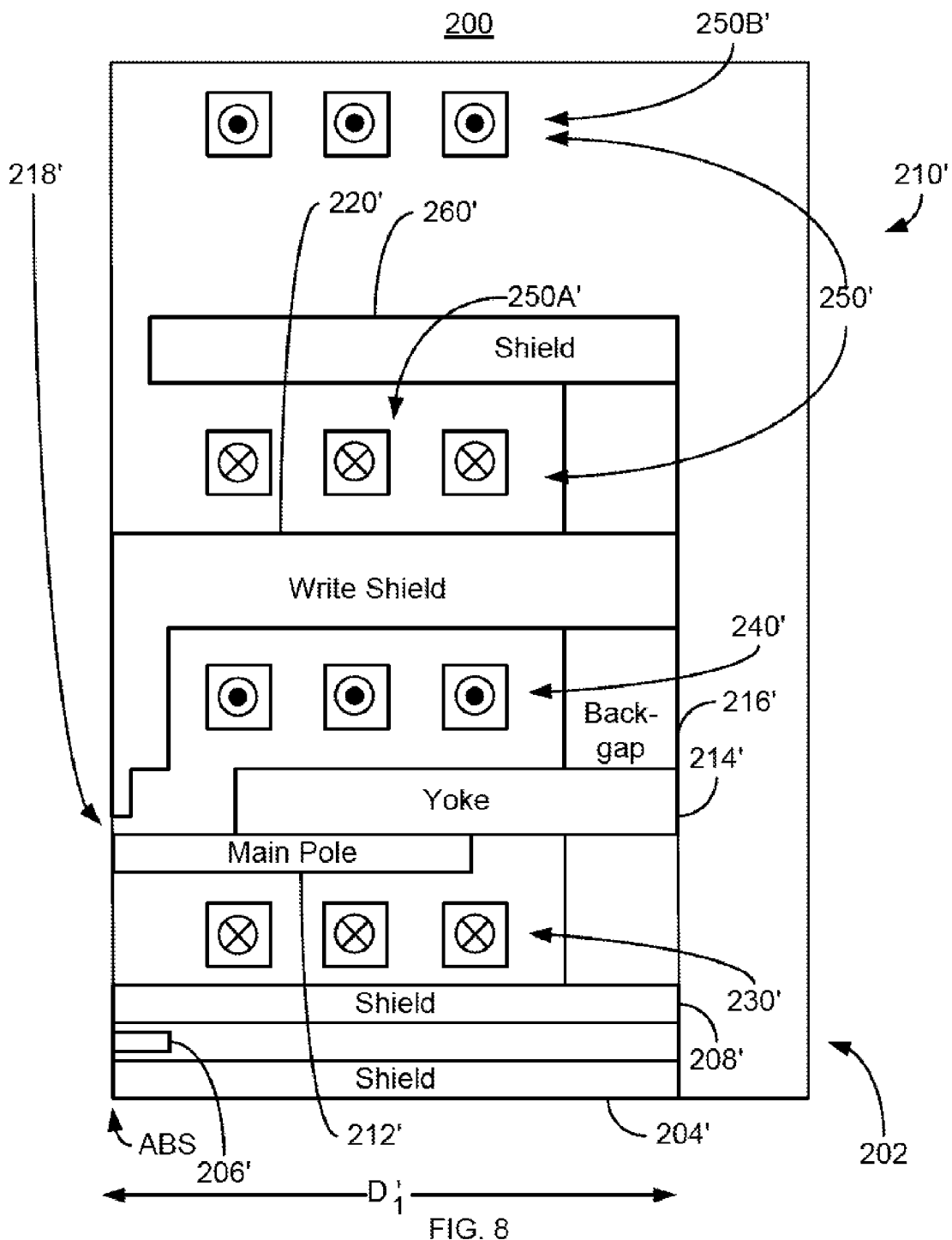
FIG. 8 is a diagram depicting another exemplary embodiment of a head.

FIG. 8 depicts a side view of another exemplary embodiment of a magnetic recording head 200'. For clarity, FIG. 8 is not to scale. For simplicity not all portions of the magnetic recording head 200' are shown. In addition, although the magnetic recording head 200' is depicted in the context of particular components other and/or different components may be used. Further, the arrangement of components may vary in different embodiments. The magnetic recording head 200' has an ABS configured to reside close to a media (not shown) during operation. The write transducer 210' may be in a merged head including a read transducer 202' and the write transducer 210' or may be in a separate write head. The magnetic recording head 200' is analogous to the magnetic recording heads 100, 100', 100", 100'", 100"", and 200. Consequently, analogous portions have similar labels. The magnetic recording head 200' thus includes a read transducer 202' and a write transducer 210' that are analogous to the read transducer 102/102'/102"/102'"/102""/202 and to the write transducer 110/110'/110"/110'"/110""/210, respectively. The read transducer 202' includes shields 208' and 204' and sensor 206' analogous to the components 108/108'/108"/108'"/108""/208, 104/104'/104"/104'"/104""/204, and 106/106'/106"/106'"/106""/206, respectively. The write transducer 210' includes the shield 208', coil(s) 230' and 240', main pole 212', yoke 214', backgap 216', write gap 218', write shield 220', additional coil 250' including turns 250A' and 250B', and additional shield 260' that are analogous to coil(s) 130/130'/130"/130'"/230 and 140/140'/140"/140'"/140""/240, main pole 112/112'/112"/112'"/112""/212, yoke 114/114'/114"/114'"/114""/214, backgap 116/116'/116"/116'"/116""/216, write gap 118/118'/118"/118'"/118""/218, write shield 120/120'/120"/120'"/120""/220, additional coil 150/150'/150"/150'"/150""/250 including turns 150A/150'/150"/150A"/150A'"/250A and 150B/150B'/150B"/150B'"/150B""/250B, and shield 260, respectively. In some embodiments, the transducer 210' may have other magnetic components, such as a wraparound shield or side shields that are not shown.

In the write transducer 210', the coils 230' and 240' may form a helical coil. In other embodiments, the coils 230' and/or 240' may be pancake coils. The third coil 250' is a helical coil having turns 250A' and 250B'. The turns 250A' are between the shields 220' and 260'. The shield 260' is between the turns 250B' and the shield 220'. In other embodiments, the helical coil 250 may include only turns 250A' that are wrapped along with the helical coil formed by coils 230' and 240'. In such an embodiments, the number of turns in the coil 250A plus the number of turns in the coil 230' is equal to or within one turn of the number of turns in the coil 240'.

The magnetic recording head 200' operates in an analogous manner to and may share the benefits of the magnetic recording heads 100, 100', 100", 100'", 100"", and 200. In particular, the write transducer 210' may have improved performance at high data rates. More specifically, the response of the write shield 220' may be improved. Further, use of the additional coil 250' in another layer than the coils 230' and 240' may allow for a shorter yoke length for the main pole 212' as well as for the reduced number of turns in the coil 230'. A shorter yoke length may allow for reduced resistance and inductance of the coil(s) 230' and/or 240'. In addition, the presence of the shield 260' may reduce inadvertent writing of other portions of the media (not shown). Thus, performance of the magnetic recording head 200' may be further improved. Further, it is noted that one or more of the features of the transducers 110, 110', 110", 110'", 110"", 210, and/or 210' may be combined. Thus, performance of the transducer 110, 110', 110", 110'", 110"", 210, and/or 210' may be further enhanced.

Figure 9:
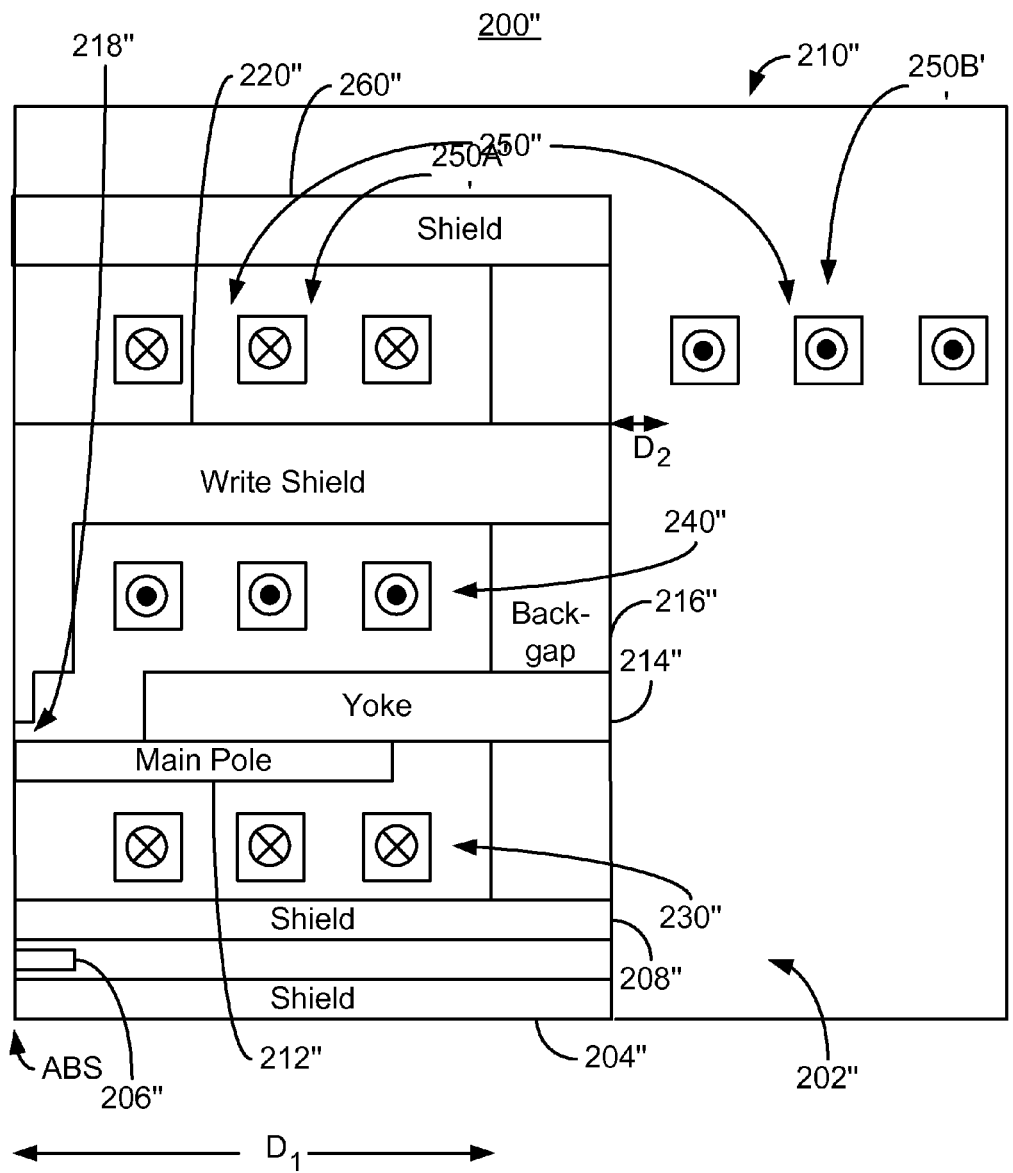
FIG. 9 is a diagram depicting another exemplary embodiment of a method for fabricating a PMR transducer.

FIG. 9 depicts a diagram depicting another exemplary embodiment of a method for fabricating a PMR transducer 200". For clarity, FIG. 9 is not to scale. For simplicity not all portions of the magnetic recording head 200" are shown. In addition, although the magnetic recording head 200" is depicted in the context of particular components other and/or different components may be used. Further, the arrangement of components may vary in different embodiments. The magnetic recording head 200" has an ABS configured to reside close to a media (not shown) during operation. The write transducer 210" may be in a merged head including a read transducer 202" and the write transducer 210" or may be in a separate write head. The magnetic recording head 200" is analogous to the magnetic recording heads 100, 100', 100", 100'", 100"", 200 and 200'. Consequently, analogous portions have similar labels. The magnetic recording head 200" thus includes a read transducer 202" and a write transducer 210" that are analogous to the read transducer 102/102'/102"/102'"/102""/202 and to the write transducer 110/110'/110"/110'"/110""/210, respectively. The read transducer 202" includes shields 208" and 204" and sensor 206" analogous to the components 108/108'/108"/108'"/108""/208, 104/104'/104"/104'"/104""/204, and 106/106'/106"/106'"/106""/206, respectively. The write transducer 210" includes the shield 208", coil(s) 230" and 240", main pole 212", yoke 214", backgap 216", write gap 218", write shield 220", additional coil 250" including turns 250A" and 250B", and additional shield 260" that are analogous to coil(s) 130/130'/130"/130'"/130""/230 and 140/140'/140"/140'"/140""/240, main pole 112/112'/112"/112'"/112""/212, yoke 114/114'/114"/114'"/114""/214, backgap 116/116'/116"/116'"/116""/216, write gap 118/118'/118"/118'"/118""/218, write shield 120/120'/120"/120'"/120""/220, additional coil 150/150'/150"/150'"/150""/250 including turns 150A/150A'/150A"/150A'"/150A""/250A and 150B/150B'/150B"/150B'"/150B""/250B, and shield 260, respectively. In some embodiments, the transducer 210" may have other magnetic components, such as a wraparound shield or side shields that are not shown. Further, Applicant notes that in the embodiment shown, the additional shield 260" extends to the ABS.

Figure 10:
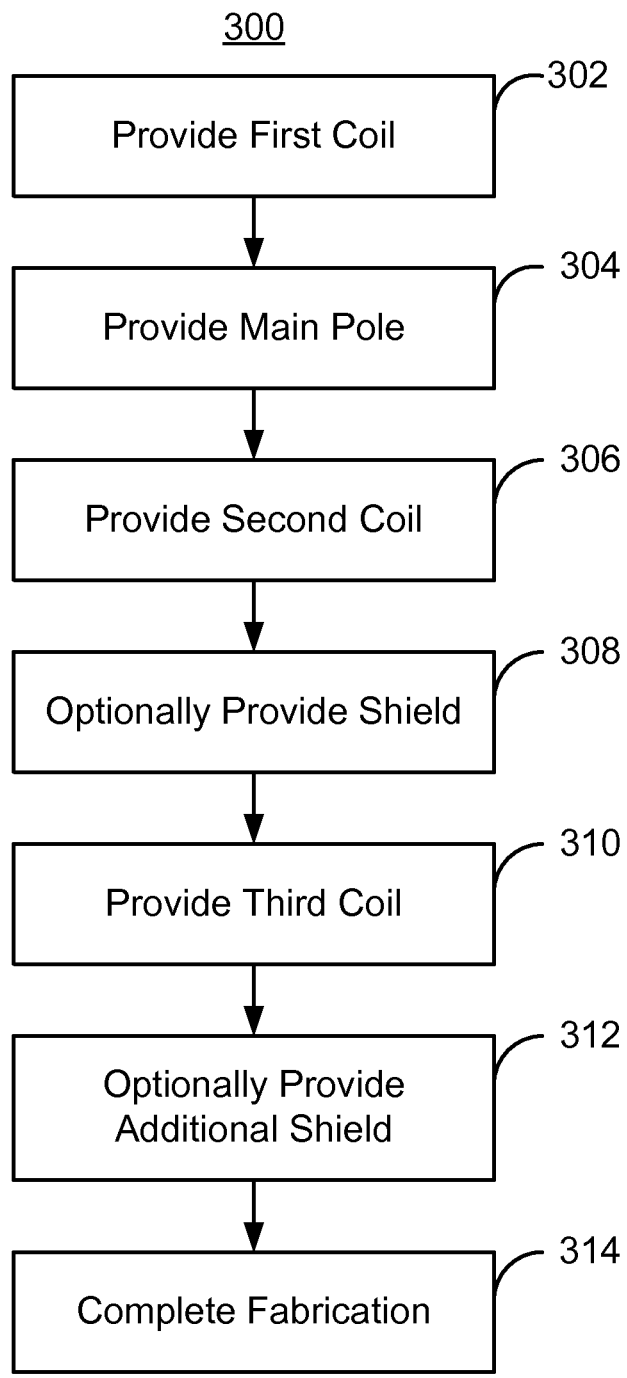
FIG. 10 is a flow chart depicting an exemplary embodiment of a method for fabricating a PMR transducer.

FIG. 10 depicts an exemplary embodiment of a method 300 of forming a portion of a magnetic recording head. For simplicity, some steps may be omitted, combined, interleaved, and/or performed in another sequence. The method 300 is described in the context of the magnetic recording head 100 and write transducer 110. However, the method 300 may be used to fabricate other heads and other transducers such as the transducers 110', 110", 110'", 210 and/or 210'. In addition, the method 300 is described in the context of fabricating a single transducer 100. However, multiple transducers may be fabricated substantially in parallel. The steps of the method 300 typically include multiple substeps.

The first coil 130 is provided, via step 302. Step 302 may include depositing and patterning the coil 130. The main pole 112 including is provided, via step 304. The yoke 114, backgap 116 and other features may also be fabricated. The second coil 140 is also provided, via step 306. Step 306 may be part of patterning the layer(s) for the second coil 240. The write shield 120 may be provided, via step 308. The third coil 150 is also provided, via step 310. Step 310 may include depositing, patterning, and insulating the turns 150A and/or 150B. An additional shield, such as the shield 260, may also be fabricated, via step 312. Fabrication of the transducer 100 may then be completed, via step 314.

Using the method 300, the transducers 110, 110', 110", 110'", 210, and/or 210' may be obtained. Consequently, the benefits of such devices may be achieved.

We claim:
1. A magnetic recording head having an air-bearing surface (ABS) configured to reside in proximity to a media during use, the magnetic recording head comprising:
   a main coil having a first coil portion and a second coil portion, the first coil portion having a first plurality of turns and configured to carry a first write current in a first direction the second coil portion having a second plurality of turns and configured to carry a second write current in a second direction;
a main pole residing between the first coil portion and the second coil portion;
a third coil having a third plurality of turns configured to carry a third write current in a third direction; and
a write shield between the second coil portion and the third coil, the second coil portion being between the write shield and the main pole.

2. The magnetic recording head of claim 1 wherein the third coil is a pancake coil having the third plurality of turns proximate to the ABS and an additional plurality of turns distal from the ABS.

3. The magnetic recording head of claim 1 further comprising:
a fourth coil carrying current in the first direction, the main pole being between the second coil portion and the fourth coil.

4. The magnetic recording head of claim 1 further comprising:
a fourth coil carrying current in the second direction, the main pole being between the first coil portion and the fourth coil.

5. The magnetic recording head of claim 1 wherein the third coil is a helical coil having the third plurality of turns and an additional plurality of turns, the third plurality of turns residing between the additional plurality of turns and the main pole.

6. The magnetic recording head of claim 1 further comprising:
an additional shield, the third coil being between the additional shield and the write shield.

7. The magnetic recording head of claim 6 wherein a portion of the additional shield resides at the ABS.

8. The magnetic recording head of claim 6 wherein the additional shield has a front surface recessed from the ABS.

9. The magnetic recording head of claim 1 wherein the first coil portion and the second portion coil form a helical coil.

10. The magnetic recording head of claim 1 wherein the first coil portion is a portion of a pancake coil including a fourth plurality of turns distal from the main pole.

11. The magnetic recording head of claim 10 wherein the second coil portion is a portion of a pancake coil including a fifth plurality of turns distal from the main pole.

12. The magnetic recording head of claim 1 wherein the third plurality of turns includes a number of turns different from the second plurality of turns and the first plurality of turns.

13. The magnetic recording head of claim 1 wherein the first plurality of turns and the second plurality of turns includes an equal number of turns.

14. The magnetic recording head of claim 1 wherein the first direction is the same as the third direction and opposite to the second direction.

15. The magnetic recording head of claim 1 wherein the main pole further includes a yoke portion and has a yoke length, the yoke length being substantially perpendicular to the ABS and less than six micrometers.

16. The magnetic recording head of claim 15 wherein the yoke length is not more than 3.5 μm.

17. A magnetic recording head having an air-bearing surface (ABS) configured to reside in proximity to a media during use, the magnetic recording head comprising:

a main coil having a first coil portion and a second coil portion, the first coil portion having a first plurality of turns and configured to carry a first write current in a first direction;
a main pole having a pole tip portion proximate to the ABS, a yoke portion distal from the ABS, and a yoke length, the yoke length being less than 6 μm;
the second coil portion having a second plurality of turns and configured to carry a second write current in a second direction opposite to the first direction, the yoke portion of the main pole residing between the first coil portion and the second coil portion;
a write shield, the second coil portion being between the write shield and the main pole; and
a third coil having a third plurality of turns and a fourth plurality of turns distal from the ABS, the third plurality of turns configured to carry a third write current in the first direction, the fourth plurality of turns carrying the third write current in the second direction, the third plurality of turns being between the ABS and the fourth plurality of turns, the write shield residing between the second coil portion and the third coil portion.

18. The magnetic recording head of claim 17 further comprising:
an additional shield, the third coil being between the additional shield and the write shield.

19. The magnetic recording head of claim 17 wherein the first coil portion and the second coil portion form a helical coil.

20. The magnetic recording head of claim 17 wherein the first coil portion is a pancake coil including a fifth plurality of turns distal from the main pole and wherein the second coil portion is a pancake coil including a sixth plurality of turns distal from the main pole.

21. A magnetic recording disk drive comprising:
a slider;
a magnetic recording head coupled with the slider and including a main coil having first coil portion and a second coil portion, a third coil, a write shield, and a main pole, the first coil portion having a first plurality of turns and configured to carry a first write current in a first direction, the second coil portion having a second plurality of turns and configured to carry a second write current in a second direction, the main pole residing between the first coil portion and the second coil portion, the third coil having a third plurality of turns configured to carry a third write current in a third direction, the write shield being between the second coil portion and the third coil, the second coil portion being between the write shield and the main pole.

22. A method for providing a magnetic recording head having an air-bearing surface (ABS) configured to reside in proximity to a media during use, the method comprising:
providing a main coil having a first coil portion and a second coil portion, the first coil portion having a first plurality of turns and configured to carry a first write current in a first direction the second coil portion having a second plurality of turns and configured to carry a second write current in a second direction;
providing a main pole residing between the first coil portion and the second coil portion;
providing a third coil having a third plurality of turns configured to carry a third write current in a third direction; and providing a write shield between the second coil portion and the third coil portion, the second coil portion being between the write shield and the main pole.

* * * * *